(12) United States Patent
Yamaya et al.

(10) Patent No.: US 10,369,645 B2
(45) Date of Patent: Aug. 6, 2019

(54) BROACHING CUTTER

(71) Applicant: AISIN AW CO., LTD., Anjo-shi, Aichi-ken (JP)

(72) Inventors: Kenichi Yamaya, Obu (JP); Manabu Tanabe, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 349 days.

(21) Appl. No.: 15/031,531

(22) PCT Filed: Nov. 26, 2014

(86) PCT No.: PCT/JP2014/081160
§ 371 (c)(1),
(2) Date: Apr. 22, 2016

(87) PCT Pub. No.: WO2015/080122
PCT Pub. Date: Jun. 4, 2015

(65) Prior Publication Data
US 2016/0250702 A1    Sep. 1, 2016

(30) Foreign Application Priority Data
Nov. 29, 2013 (JP) .................................. 2013-248511

(51) Int. Cl.
*B23F 21/26* (2006.01)
*B23D 43/02* (2006.01)

(52) U.S. Cl.
CPC .............. *B23F 21/26* (2013.01); *B23D 43/02* (2013.01)

(58) Field of Classification Search
CPC ........ B23D 43/02; B23D 43/00; B23D 37/00; B23D 37/005; B23F 21/26; B23F 21/24
See application file for complete search history.

(56) References Cited

U.S. PATENT DOCUMENTS 1,849,392 A     3/1932  West
2,683,919 A *   7/1954  Psenka .................. B23D 43/02
                                                    407/18
(Continued)

FOREIGN PATENT DOCUMENTS

JP      S56-48430 U     4/1981
JP      S63-295112 A    12/1988
(Continued)

OTHER PUBLICATIONS

Feb. 17, 2015 Search Report issued in International Patent Application No. PCT/JP2014/081160.

*Primary Examiner* — Willmon Fridie, Jr.
(74) *Attorney, Agent, or Firm* — Oliff PLC

(57) ABSTRACT

A broaching cutter includes a plurality of initial cutting blade stages for cutting formation portions to be tooth body portions in internal teeth, a plurality of intermediate cutting blade stages for cutting the formation portions to be the tooth body portions further deeply, and a plurality of final cutting blade stages for cutting formation portions to be clearance portions located deeper than the tooth body portions, the initial cutting blade stages, the intermediate cutting blade stages, and the final cutting blade stages being sequentially arranged from an upstream side in a cutting direction S. Each of a pair of distal end corners of each of cutting blades in the intermediate and final cutting blade stages has a chamfered shape larger than that of a curved shape of a pair of distal end corners of each of the cutting blades in the initial cutting blade stages.

7 Claims, 4 Drawing Sheets

(56) References Cited

U.S. PATENT DOCUMENTS

| | | | | |
|---|---|---|---|---|
| 2,898,670 A * | 8/1959 | Pernack | ............... | B23D 43/005 407/18 |
| 3,178,800 A * | 4/1965 | Psenka | ................... | B23D 43/00 407/16 |
| 3,227,008 A * | 1/1966 | Celovsky | ............... | B23D 43/00 219/69.17 |
| 3,795,958 A * | 3/1974 | Psenka | ................... | B23F 21/26 407/19 |
| 4,012,829 A * | 3/1977 | Dvorov | ................. | B23D 43/02 29/90.01 |
| 5,503,506 A * | 4/1996 | Yuan | ..................... | B23D 43/02 29/90.01 |
| 5,865,569 A * | 2/1999 | Holstein | ............... | B23D 43/02 407/13 |
| 7,338,235 B2 * | 3/2008 | Weghaus | ............... | B23D 43/02 407/13 |
| 7,465,134 B2 * | 12/2008 | Schlotter | ............... | B23D 37/14 409/244 |
| 2003/0012610 A1 * | 1/2003 | Heyraud | ............... | B23D 43/02 407/13 |
| 2011/0195375 A1 * | 8/2011 | Kuehner | ............. | B23D 43/005 433/102 |

FOREIGN PATENT DOCUMENTS

| | | |
|---|---|---|
| JP | H07-164241 A | 6/1995 |
| JP | 2002-113614 A | 4/2002 |
| JP | 2005-088116 A | 4/2005 |
| JP | 2007-175826 A | 7/2007 |
| JP | 2008-221418 A | 9/2008 |
| JP | 2011-056628 A | 3/2011 |

* cited by examiner

BROACHING CUTTER

TECHNICAL FIELD

Preferred embodiments relate to a broaching cutter for forming a plurality of internal teeth by cutting a processing hole of a workpiece.

BACKGROUND ART

In a broaching cutter for cutting internal teeth, a plurality of cutting blade stages each having a plurality of cutting blades arranged side by side in a circumferential direction are provided side by side in an axial direction. In the broaching cutter, a plurality of cutting blade stages for rough cutting and a plurality of cutting blade stages for finish cutting are sequentially provided side by side in a cutting direction. In the rough cutting, the cutting blades sequentially cut a processing hole in a workpiece in a radial direction to form intermediate shapes of the internal teeth. Then, in the finish cutting, the cutting blades sequentially cut the intermediate shapes of internal teeth in a circumferential direction to form the internal teeth.

For example, a broach for internal teeth gear processing described in Patent Document 1 uses four types of cutting blades for cutting a workpiece. Among the four types of cutting blades, a first cutting blade radially cuts the workpiece to form a tooth body portion in the workpiece, a second cutting blade cuts an inner peripheral portion at an inner periphery of the tooth body portion, a third cutting blade cuts an outer peripheral portion at an outer periphery (deep side) of the tooth body portion, and a fourth cutting blade cuts the tooth body portion in a circumferential direction so as to increase a circumferential width of the tooth body portion. In Patent Document 1, the first cutting blade is used for rough cutting of the tooth body portion.

RELATED-ART DOCUMENTS

Patent Documents

[Patent Document 1] Japanese Patent Application Publication No. 2008-221418 (JP 2008-221418 A)

SUMMARY

Problem to be Solved

In a conventional broach as described in Patent Document 1, however, the shape of the first cutting blade is not specifically devised. A pair of distal end corners in the first cutting blade has an obtuse angle or a right angle. The first cutting blade for rough cutting has a large cutting depth. Thus, particles of a metal constituting the broach are easily dropped off from the first cutting blade, and a high degree of abrasion thus occurs on the first cutting blade.

Preferred embodiments have been made in view of the foregoing, and is intended to provide a broaching cutter including intermediate cutting blade stages each having a curved shape or a chamfered shape to reduce a cutting depth of cutting blades in initial cutting blade stages, thereby suppressing occurrence of abrasion on the initial cutting blade stages.

Means for Solving the Problem

An aspect of one preferred embodiment is directed to a broaching cutter for sequentially cutting a processing hole in a workpiece with a plurality of cutting blade stages provided side by side in an axial direction and for forming a plurality of internal teeth in the processing hole with a plurality of cutting blades arranged side by side in a circumferential direction of each of the cutting blade stages in such a manner that the internal teeth are arranged side by side in the circumferential direction, the broaching cutter being characterized in that the cutting blade stages are configured to cut the processing hole in such a manner that cutting locations of the cutting blades become deeper stepwise in a radial direction of the processing hole in the workpiece, and are also configured to include a plurality of initial cutting blade stages for cutting formation portions to be tooth body portions of the internal teeth with the cutting blades, a plurality of intermediate cutting blade stages for cutting, with the cutting blades, the formation portions to be the tooth body portions more deeply than the initial cutting blade stages, and a plurality of final cutting blade stages for cutting, with the cutting blades, formation portions to be clearance portions extending from the tooth body portions toward an outer periphery in the radial direction, the initial cutting blade stages, the intermediate cutting blade stages, and the final cutting blade stages are sequentially arranged side by side from an upstream side in a cutting direction, a pair of distal end corners of each of the cutting blades in the intermediate cutting blade stages and a pair of distal end corners of each of the cutting blades in the final cutting blade stages each have a curved shape or a chamfered shape larger than a curved shape or a chamfered shape of a pair of distal end corners of each of the cutting blades in the initial cutting blade stages, and each of the initial cutting blade stages has a cutting depth smaller than a cutting depth of each of the intermediate cutting blade stages and the final cutting blade stages.

Another aspect of a preferred embodiment is directed to a broaching cutter for sequentially cutting a processing hole in a workpiece with a plurality of cutting blade stages provided side by side in an axial direction and for forming a plurality of internal teeth in the processing hole with a plurality of cutting blades arranged side by side in a circumferential direction of each of the cutting blade stages in such a manner that the internal teeth are arranged side by side in the circumferential direction, the broaching cutter being characterized in that the cutting blade stages are configured to cut the processing hole in such a manner that cutting locations of the cutting blades become deeper stepwise in a radial direction of the processing hole in the workpiece, and are also configured to include a plurality of first cutting blade stages in which a pair of distal end corners of each of the cutting blades has a curved shape or a chamfered shape and a plurality of second cutting blade stages in which a pair of distal end corners of each of the cutting blades has a curved shape or a chamfered shape larger than the curved shape or the chamfered shape in the first cutting blade stages, the first cutting blade stages and the second cutting blade stages being arranged side by side in a cutting direction, and each of the first cutting blade stages has a cutting depth smaller than a cutting depth of each of the second cutting blade stages.

In the broaching cutter in the aspect, the cutting blade stages for cutting, in the processing hole in the workpiece, the formation portions to be the tooth body portions in the internal teeth are provided so as to be divided into the initial cutting blade stages and intermediate cutting blade stages. Here, formation portions refer to portions in the workpiece.

The curved shape or the chamfered shape formed at the pair of distal end corners of each of the cutting blades in the intermediate cutting blade stages is larger than the curved shape or the chamfered shape formed at the pair of distal end corners of each of the cutting blades in the initial cutting blade stages. Here, the pair of distal end corners of each of the cutting blades in the initial cutting blade stages may have a square shape that is hardly curved or chamfered. However, for manufacturing reasons or the like, the pair of distal end corners of each of the cutting blades in the initial cutting blade stages may have a slightly curved or chamfered shape.

Since the pair of distal end corners of each of the cutting blades in the initial cutting blade stages is hardly curved or chamfered or is slightly curved or chamfered, biting (catching) of the workpiece by the cutting blades can be suitably maintained. The cutting blades in the initial cutting blade stages have a cutting depth in the workpiece set to be smaller than those of the cutting blades in the intermediate cutting blade stages and the cutting blades in the final cutting blade stages. With this configuration, occurrence of abrasion on the pair of distal end corners of each of the cutting blades in the initial cutting blade stages can be suppressed.

The pair of distal end corners of each of the cutting blades in the intermediate cutting blade stages has a curved shape or a chamfered shape. With this configuration, edges of the distal end corners of the cutting blades in the intermediate cutting blade stages can be strengthened, and occurrence of abrasion thereof can thus be suppressed. Since the edges of the distal end corners can be strengthened, the cutting depth in the workpiece of the cutting blades in the intermediate cutting blade stages can be set to be large. Thus, the amount of decrease in the cutting depth of the cutting blades in the initial cutting blade stages can be compensated by the cutting depth of the cutting blades in the intermediate cutting blade stages.

In general, in a case where the forming pitch of the cutting blades in each cutting blade stage is reduced, the cutting depth of the cutting blades decreases, and abrasion thereof can thus be reduced, but a land width of the cutting blades in the axial direction decreases, and the lifetime of the cutting blades is thus shortened. In this regard, in the initial cutting blade stages and the intermediate cutting blade stages, occurrence of abrasion of the cutting blades is suppressed, thereby suppressing shortening of lifetime of the cutting blades. In the initial cutting blade stages and the intermediate cutting blade stages, the forming pitches of the cutting blades are reduced, and the cutting depths of the cutting blades can thus be reduced.

The curved shape or the chamfered shape formed at the pair of distal end corners of each of the cutting blades in the final cutting blade stages is also larger than the curved shape or the chamfered shape formed at the pair of distal end corners of each of the cutting blades in the initial cutting blade stages. With this configuration, edges of the distal end corners of the cutting blades in the final cutting blade stages can be strengthened, and occurrence of abrasion thereof can thus be suppressed.

As described above, in the broaching cutter in the aspect, the intermediate cutting blade stages having the curved shape or the chamfered shape enables the cutting depth of the cutting blades in the initial cutting blade stages to be reduced, thereby suppressing occurrence of abrasion of the initial cutting blade stages.

In the other aspect of the broaching cutter, in the second cutting blade stages in which the pair of distal end corners of each of the cutting blades has a larger curved shape or a larger chamfered shape, edges of the pair of distal end corners can be strengthened, and occurrence of abrasion thereof can thus be suppressed. Since the edges of the pair of distal end corners can be strengthened, the cutting depth in the workpiece of the cutting blades in the second cutting blade stages can be set to be larger. Thus, the amount of decrease in the cutting depth of the cutting blades in the first cutting blade stages can be compensated by the cutting depth of the cutting blades in the second cutting blade stages.

In a manner similar to the initial cutting blade stages in the broaching cutter of the aspect, the pair of distal end corners of each of the cutting blades in the first cutting blade stages may be hardly curved or chamfered shape.

In the broaching cutter of the other aspect, the second cutting blade stages having a curved shape or a chamfered shape enables the cutting depth of the cutting blades in the first cutting blade stages to be reduced, thereby suppressing occurrence of abrasion of the initial cutting blade stages.

DESCRIPTION

A preferred embodiment of the broaching cutter described above will be described.

In the broaching cutter in the aspect described above, a guide portion for guiding a center of the processing hole in the workpiece to a center of the broaching cutter may be provided on an upstream side of the initial cutting blade stages in the cutting direction, and the initial cutting blade stages may include a cutting blade stage adjacent to the guide portion.

In the cutting blade stage adjacent to a downstream side of the guide portion, a circumferential width of a blade bottom portion between two cutting blades adjacent to each other in the circumferential direction is very small. Thus, it is very difficult to form a curved shape or a chamfered shape in a pair of distal end corners of each of the cutting blades in the cutting blade stage adjacent to the guide portion with a tool such as grinding stone. In view of this, the pair of distal end corners of each of the cutting blades in the cutting blade stage adjacent to the guide portion has a small curved shape or a small chamfered surface so that the curved shape or the chamfered shape can be easily formed. The curved shape or the chamfered shape can be formed by manual rounding with, for example, a brush or a grinding stone, and thus, the cost can be reduced.

The curved shape or the chamfered shape formed at the pair of distal end corners of each of the cutting blades in the intermediate cutting blade stages and the curved shape or the chamfered shape formed at the pair of distal end corners of each of the cutting blades in the final cutting blade stages may extend across an overall length of a clearance face located at an outer periphery of each of the cutting blades.

In this case, even when rake faces of the cutting blades in the intermediate cutting blade stages and the final cutting blade stages are repetitively subjected to re-polishing, and land widths of the cutting blades in the axial direction are reduced, the effect of suppressing occurrence of abrasion by the curved shape or the chamfered shape can be maintained.

In the broaching cutter in the other aspect described above, the first cutting blade stages are preferably disposed on an upstream side of the second cutting blade stages in the cutting direction.

A guide portion for guiding a center of the processing hole in the workpiece to a center of the broaching cutter may be provided on an upstream side of the first cutting blade stages in the cutting direction, and the first cutting blade stages may include a cutting blade stage adjacent to the guide portion.

In this case, actions and effects similar to those obtained by using the cutting blade stage adjacent to the guide portion in the broaching cutter in the aspect can be obtained.

EMBODIMENTS

A broaching cutter according to an embodiment will be described with reference to the drawings.

Figure 1:
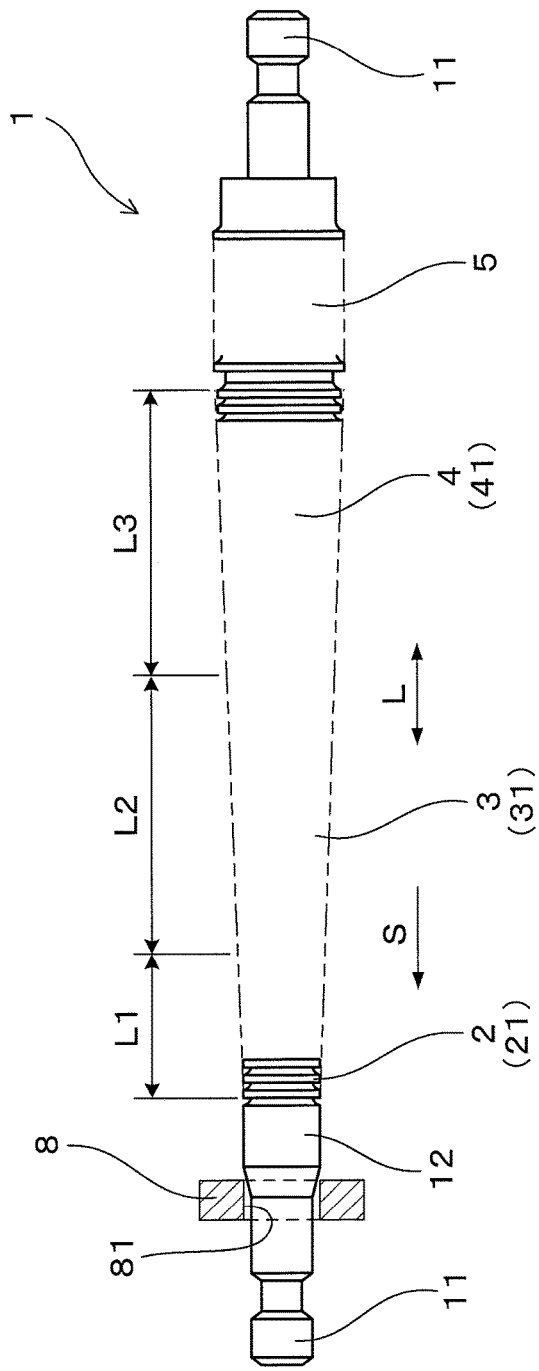
FIG. 1 is an explanatory diagram illustrating a broaching cutter according to an embodiment.
Figure 2:
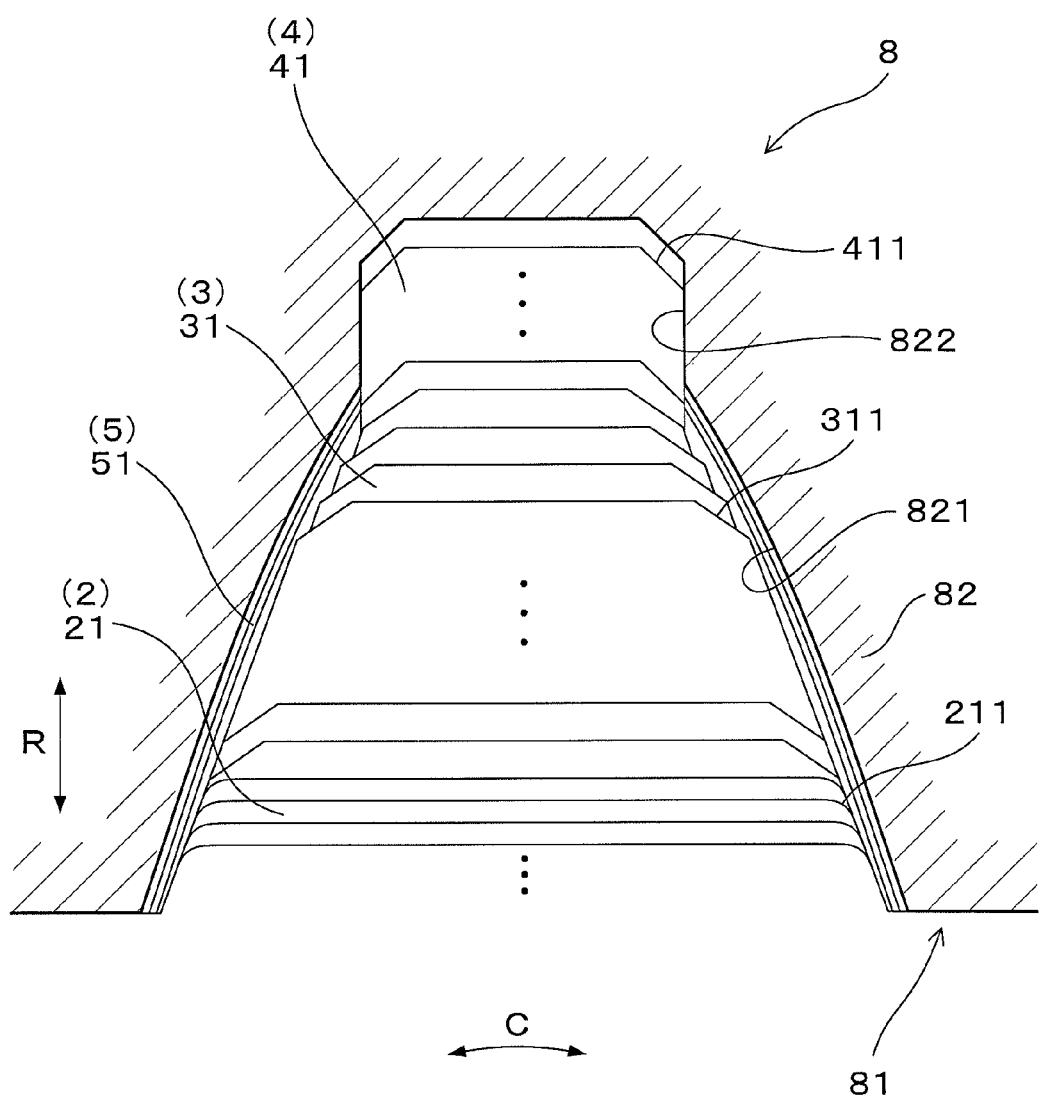
FIG. 2 is an explanatory diagram illustrating a state in which cutting blades in cutting blade stages of the broaching cutter cuts a processing hole in a workpiece deeply stepwise to form internal teeth.

As illustrated in FIGS. 1 and 2, a broaching cutter 1 according to the present embodiment sequentially cuts a processing hole 81 in a workpiece 8 with cutting blade stages 2, 3, and 4 provided side by side in an axial direction L. The broaching cutter 1 is used for forming a plurality of internal teeth 82 in the processing hole 81 with cutting blades 21, 31, and 41 arranged side by side in a circumferential direction C of the respective cutting blade stages 2, 3, and 4 in such a manner that the internal teeth 82 are arranged side by side in the circumferential direction C. The cutting blade stages 2, 3, and 4 are configured in such a manner that cutting locations of the cutting blades 21, 31, and 41 become deeper stepwise in a radial direction R of the processing hole 81 in the workpiece 8. In the broaching cutter 1, the initial cutting blade stages 2, the intermediate cutting blade stages 3, and the final cutting blade stages 4 are sequentially arranged side by side in this order from an upstream side in a cutting direction S. The initial cutting blade stages 2 correspond to first cutting blade stages, and the intermediate cutting blade stages 3 and the final cutting blade stages 4 correspond to second cutting blade stages.

In FIG. 1, in the broaching cutter 1, a region where the initial cutting blade stages 2 are provided side by side in the axial direction L is denoted by L1, a region where the intermediate cutting blade stages 3 are provided side by side in the axial direction L is denoted by L2, and a region where the final cutting blade stages 4 are provided side by side in the axial direction L is denoted by L3. FIG. 2 illustrates a state in which the cutting blades 21, 31, and 41 in the respective cutting blade stages 2, 3, and 4 cut the processing hole 81 in the workpiece 8 to depths that increase stepwise to form internal teeth 82.

As illustrated in FIG. 2, in the initial cutting blade stages 2, formation portions to be tooth body portions 821 of the internal teeth 82 in the workpiece 8 are cut with the cutting blades 21. In the intermediate cutting blade stages 3, the formation portions to be the tooth body portions 821 are further cut to deeper locations with the cutting blades 31. In the final cutting blade stages 4, formation portions to be clearance portions 822 are cut with the cutting blades 41 located at locations deeper than the tooth body portions 821. Each of the clearance portions 822 has a width in the circumferential direction C smaller than a width of a corresponding one of the tooth body portions 821 in the circumferential direction C.

A pair of distal end corners 311 of each of the cutting blades 21 in the intermediate cutting blade stages 3 and a pair of distal end corners 411 of each of the cutting blades 41 in the final cutting blade stages 4 have chamfered shape larger than a curved shape of a pair of distal end corners 211 of each of the cutting blades 21 in the initial cutting blade stages 2. As illustrated in FIG. 3, a cutting depth x1 in the initial cutting blade stages 2 is smaller than a cutting depth x2 in the intermediate cutting blade stages 3 and a cutting depth x3 in the final cutting blade stages 4. Each of the cutting depths x1, x2, and x3 is determined in accordance with a level difference between front and rear stages of the cutting blades 21, 31, and 41.

The broaching cutter 1 according to the present embodiment will be described in detail with reference to FIGS. 1 to 5.

As illustrated in FIG. 1, the broaching cutter 1 according to the present embodiment is attached to a broach processing machine, and is used for performing a drawing process on a round hole that is the processing hole 81 formed at a center of the disc-shaped workpiece 8. In performing the drawing process on the processing hole 81 in the workpiece 8, the cutting blade stages 2, 3, and 4 of the broaching cutter 1 pass through the processing hole 81 in the workpiece 8.

A shank 11 for attaching the broaching cutter 1 to the broach processing machine is provided at each end of the broaching cutter 1. A guide portion 12 for guiding a center of the processing hole 81 in the workpiece 8 to a center of the broaching cutter 1 is provided at a location adjacent to a downstream side of the shank 11 located on an upstream side of the broaching cutter 1 in the cutting direction (drawing direction) S. In the following description, an upstream side refers to an upstream side in the cutting direction S, and a downstream side refers to a downstream side in the cutting direction S.

As illustrated in FIGS. 1 and 2, the initial cutting blade stages 2, the intermediate cutting blade stages 3, and the final cutting blade stages 4 are sequentially provided side by side in this order in the cutting direction S from the upstream side, at the downstream side of the guide portion 12 in the broaching cutter 1. The initial cutting blade stages 2, the intermediate cutting blade stages 3, and the final cutting blade stages 4 are cutting blade stages for rough cutting that forms intermediate shapes of the internal teeth 82 by sequentially cutting the processing hole 81 in the workpiece 8 in the radial direction R. The initial cutting blade stages 2 include a cutting blade stage adjacent to the guide portion 12.

The number of the initial cutting blade stages 2 in the broaching cutter 1 is smaller than the number of the intermediate cutting blade stages 3 in the broaching cutter 1.

As illustrated in FIG. 1, at a location adjacent to the downstream side of the final cutting blade stages 4, a plurality of shell cutting blade stages 5 are formed as cutting blade stages for finish cutting, and are used for cutting deeply stepwise in the circumferential direction C of the intermediate shape of the internal teeth 82 of the processing hole 81 in the workpiece 8. As illustrated in FIG. 2, the shell cutting blade stages 5 are provided side by side in the axial direction L of the broaching cutter 1, and include a plurality of cutting blades 51 arranged side by side in the circumferential direction C. A shape of a pair of tooth surfaces of the tooth body portions 821 in the internal teeth 82 is formed by the cutting blades 51 of the shell cutting blade stages 5. At a location adjacent to the downstream side of the shell cutting blade stages 5, another guide portion for guiding the center of the processing hole 81 in the workpiece 8 to the center of the broaching cutter 1 may be provided.

In the broaching cutter 1 of the present embodiment, the internal teeth 82 of an involute spline shape including the tooth body portions 821 and extending along an involute curve are formed by cutting to be arranged side by side in the circumferential direction C. In the internal teeth 82 formed by the broaching cutter 1, the tooth body portions 821 has a helical shape with respect to the axial direction L of the workpiece 8. The broaching cutter 1 forms an internal gear serving as a helical gear by cutting the processing hole 81 in the workpiece 8.

In the broaching cutter 1, a plurality of internal teeth 82 of a square spline shape having tooth body portions 821 that are parallel to each other may be formed in the circumferential direction C of the processing hole 81 in the workpiece 8. The cutting blades 21, 31, 41, and 51 of the respective cutting blade stages 2, 3, 4, and 5 in the broaching cutter 1 may be provided at regular intervals along a full circumference in the circumferential direction C. The cutting blades 21, 31, 41, and 51 of the respective cutting blade stages 2, 3, 4, and 5 may not be formed along the full circumference in the circumferential direction C, and may be formed at two to eight locations in the circumferential direction C, for example.

Figure 3A:
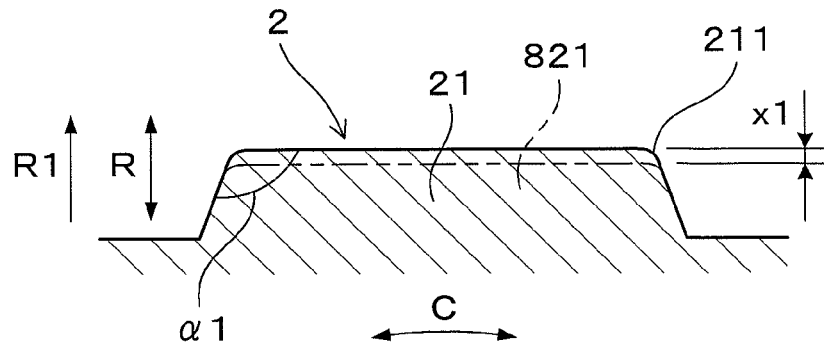
FIG. 3A is an explanatory diagram illustrating a cutting blade in an initial cutting blade stage.

As illustrated in FIG. 3A, the pair of distal end corners 211 of each of the cutting blades 21 in the initial cutting blade stages 2 has a curved shape whose radius of curvature is 20 µm. Since the pair of distal end corners 211 of each of the cutting blades 21 in the initial cutting blade stages 2 has the small curved shape, biting (catching) of the workpiece 8 by the cutting blades 21 can be suitably maintained. The pair of distal end corners 211 of each of the cutting blades 21 in the initial cutting blade stages 2 may have a square shape having a hardly curved or chamfered shape.

Each of the cutting blades 21 in the initial cutting blade stages 2 has a trapezoidal shape in which a distance between a pair of side surfaces decreases toward an outer periphery R1 in the radial direction R, when viewed in the axial direction L. The pair of distal end corners 211 of each of the cutting blades 21 in the initial cutting blade stages 2 has an obtuse shape. The pair of the distal end corners 211 of each of the cutting blades 21 in the initial cutting blade stages 2 according to the present embodiment has an obtuse shape having an angle $\alpha 1$ of 110°.

Figure 3B:
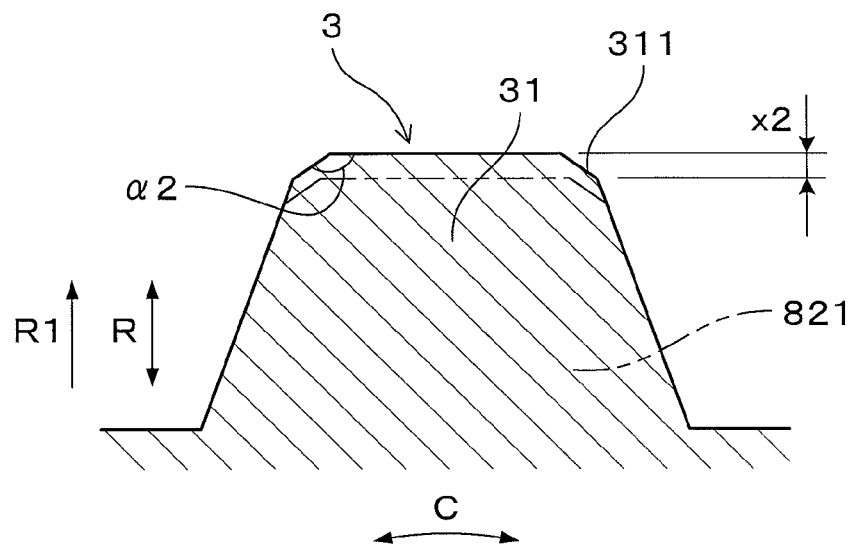
FIG. 3B is an explanatory diagram illustrating a cutting blade in an intermediate cutting blade stage.

As illustrated in FIG. 3B, the pair of distal end corners 311 of each of the cutting blades 31 in the intermediate cutting blade stages 3 has a chamfered shape having a length of 100 µm in the radial direction R and the circumferential direction C. The size of the chamfered shape of the pair of distal end corners 311 of each of the cutting blades 31 in the intermediate cutting blade stages 3 can be determined in the range from 50 to 350 µm. The pair of distal end corners 311 of each of the cutting blades 31 in the intermediate cutting blade stages 3 may have a curved shape whose radius of curvature is 50 to 350 µm.

Each of the cutting blades 31 in the intermediate cutting blade stages 3 has a trapezoidal shape in which a distance between a pair of side surfaces decreases toward the outer periphery R1 in the radial direction R, when viewed in the axial direction L. In the cutting blades 31 in the intermediate cutting blade stages 3, each of the distal end corners 311 located at a distal outer periphery of the chamfered shape has an obtuse shape having an angle $\alpha 2$ larger than the angle $\alpha 1$ of the obtuse shape of the initial cutting blade stages 2. Each of the distal end corners 311 located at the distal outer periphery of the chamfered shape in the cutting blades 31 in the intermediate cutting blade stages 3 has an obtuse shape having an angle $\alpha 2$ of 145°.

Figure 3C:
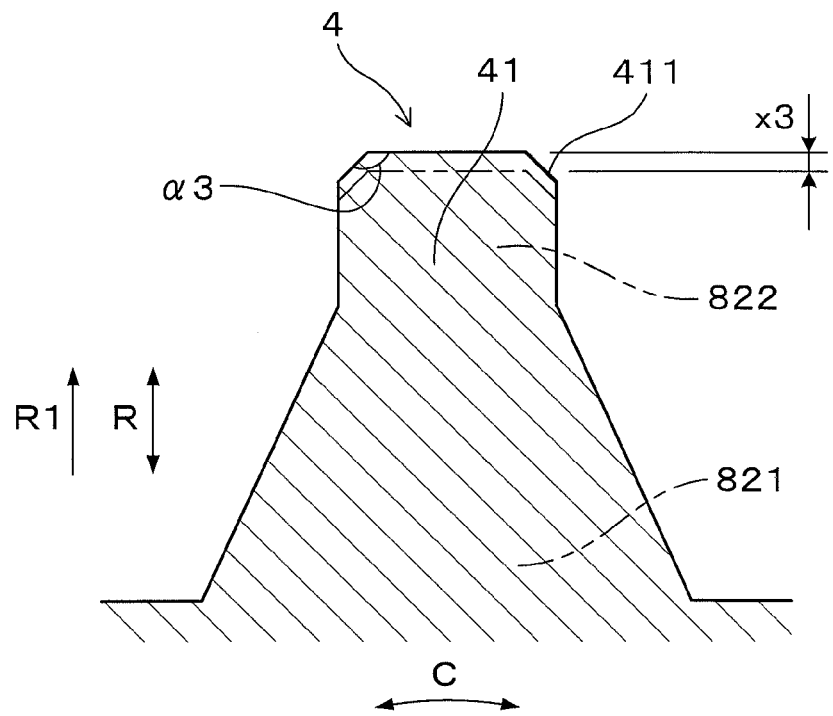
FIG. 3C is an explanatory diagram illustrating a cutting blade in a final cutting blade stage, when viewed in an axial direction of the broaching cutter according to the embodiment.

As illustrated in FIG. 3C, the pair of distal end corners 411 of each of the cutting blades 41 in the final cutting blade stages 4 has a chamfered shape having a length of 100 µm in the radial direction R and the circumferential direction C. The size of the chamfered shape formed at the pair of distal end corners 411 of each of the cutting blades 41 in the final cutting blade stages 4 can be determined within the range from 50 to 350 µm. Alternatively, the pair of distal end corners 411 of each of the cutting blades 41 in the final cutting blade stages 4 may have a curved shape whose radius of curvature is 50 to 350 µm.

An outer peripheral distal portion of each of the cutting blades 41 in the final cutting blade stages 4 has a pair of parallel side surfaces when viewed in the axial direction L. In the pair of distal end corners 411 of each of the cutting blades 41 in the final cutting blade stages 4, each of the distal end corners 411 located at a distal outer periphery of the chamfered shape has an obtuse shape having an angle $\alpha 3$ larger than the angle $\alpha 1$ of the obtuse shape in the initial cutting blade stages 2 and smaller than the angle $\alpha 2$ of the obtuse shape in the intermediate cutting blade stages 3. In the cutting blades 41 in the final cutting blade stages 4 according to the present embodiment, each of the distal end corners 411 located at the distal outer periphery of the chamfered shape has an obtuse shape with an angle $\alpha 3$ of 135°.

Figure 4A:
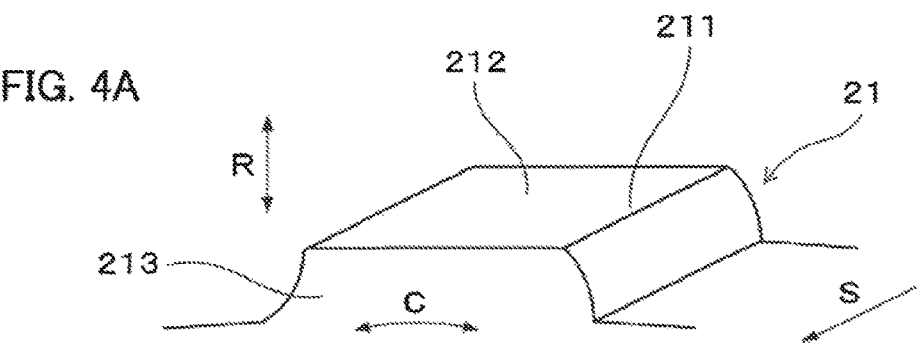
FIG. 4A is a perspective view of a cutting blade in the initial cutting blade stage and FIG. 4B is a perspective view of a cutting blade in the intermediate cutting blade stage, according to the embodiment.
Figure 4B:
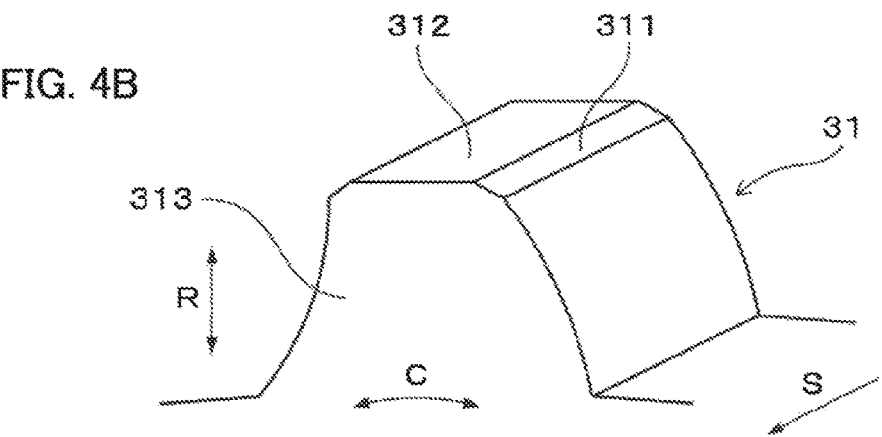

FIG. 4A illustrates the cutting blades 21 in the initial cutting blade stages 2. FIG. 4B illustrates the cutting blades 31 in the intermediate cutting blade stages 3. When sharpness of the cutting blades 21 and 31 degrades after a predetermined number of cutting processes on the processing hole 81 in the workpiece 8, rake faces 213 and 313 are polished by a grinder.

As illustrated in FIG. 4B, the chamfered shape of the pair of the distal end corners 311 of each of the cutting blades 31 in the intermediate cutting blade stages 3 extends across the overall length of a clearance face 312 located at an outer periphery of each of the cutting blades 31. The chamfered shape of the pair of distal end corners 311 of each of the cutting blades 31 in the intermediate cutting blade stages 3 is maintained even after repetitive repolishing on the rake faces 313 of the cutting blades 31. The chamfered shape of the pair of distal end corners 411 of each of the cutting blades 41 in the final cutting blade stages 4 also extends across the overall length of a clearance face located at an outer periphery of each of the cutting blades 41.

As illustrated in FIGS. 3A to 3C, the initial cutting depth x1 in the workpiece 8 determined in accordance with the level difference between the front and rear stages of the cutting blades 21 in the initial cutting blade stages 2 can be determined within the range from 10 to 25 µm. The intermediate cutting depth x2 in the workpiece 8 determined in accordance with the level difference between the front and rear stages of the cutting blades 31 in the intermediate cutting blade stages 3 can be determined within the range from 25 to 80 µm. The initial cutting depth x1 is less than or equal to the intermediate cutting depth x2. The initial cutting depth x1 can be less than or equal to a half of the intermediate cutting depth x2.

A final cutting depth x3 in the workpiece 8 determined in accordance with the level difference between the front and rear stages of the cutting blades 41 in the final cutting blade stages 4 can be determined within the range from 20 to 65 µm. The final cutting depth x3 can be larger than the initial cutting depth x1 and smaller than the intermediate cutting depth x2.

Actions and effects of the broaching cutter 1 according to the present embodiment will be described.

The cutting blade stages for performing rough cutting on the processing hole 81 in the workpiece 8 stepwise in the radial direction R have large cutting depths of cutting blades, and are most susceptible to abrasion. In the broaching cutter 1 according to the present embodiment, the cutting blade stages for performing rough cutting on formation portions to be the tooth body portions 821 in the internal teeth 82 in the processing hole 81 in the workpiece 8 in the radial direction R are provided so as to be divided into the initial cutting blade stages 2 and the intermediate cutting blade stages 3. The initial cutting depth x1 in the workpiece 8 of the cutting blades 21 in the initial cutting blade stages 2 is set to be smaller than the intermediate cutting depth x2 in the workpiece 8 of the cutting blades 31 of the intermediate cutting blade stages 3. Thus, occurrence of abrasion by the pair of distal end corners 211 of each of the cutting blades 21 in the initial cutting blade stages 2 can be suppressed.

Figure 5:
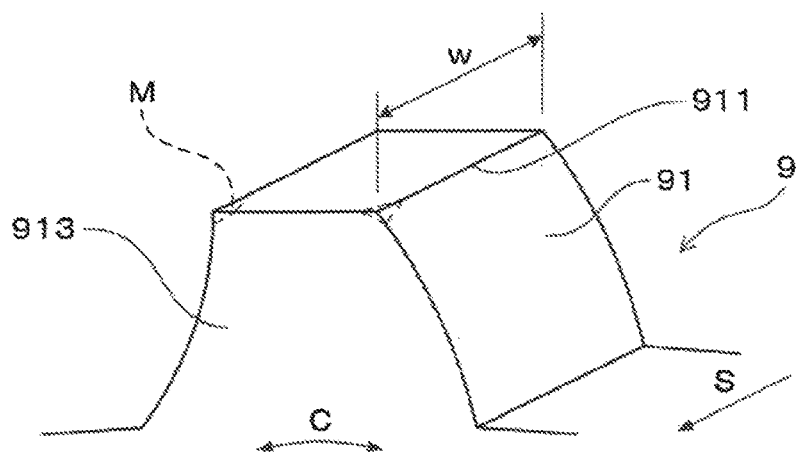
FIG. 5 is a perspective view of a cutting blade in a typical cutting blade stage in the embodiment.

FIG. 5 illustrates a cutting blade 91 in a typical cutting blade stage 9. In the cutting blade 91 in the cutting blade stage 9, metal particles are dropped off from a side of each distal end corner 911 adjacent to the rake face 913 to a downstream side in the cutting direction S, and abrasion M thus occurs. The abrasion M easily occurs in a case where the cutting blade 91 has a large cutting depth or an angle formed by the distal end corner 911 of the cutting blade 91 when viewed in the axial direction L is close to a right angle. The degree of the abrasion M is expressed as a length of the resulting shape in the axial direction L.

In view of this, occurrence of abrasion M is suppressed by reducing the initial cutting depth x1 of the cutting blades 21 in the initial cutting blade stages 2, and by increasing the angle α2 of the obtuse shape of the distal end corners 311 of the cutting blades 31 in the intermediate cutting blade stages 3.

Specifically, each of the cutting blades 31 in the intermediate cutting blade stages 3 has a chamfered shape larger than the curved shape of the pair of the distal end corners 211 of each of the cutting blades 21 in the initial cutting blade stages 2. With this configuration, the angle α2 of the obtuse shape of the distal end corners 311 located at the distal outer periphery of the chamfered shape of the cutting blades 31 of the intermediate cutting blade stages 3 increases, and edges of the distal end corners 311 is thus strengthened. As a result, occurrence of abrasion on the distal end corners 311 located at the distal outer periphery of the chamfered shape of the cutting blades 31 in the intermediate cutting blade stages 3 can be suppressed.

Since the edges of the intermediate cutting blade stages 3 is strengthened, the intermediate cutting depth x2 in the workpiece 8 of the cutting blades 31 in the intermediate cutting blade stages 3 can be set to be larger. Thus, the amount of decrease in the initial cutting depth x1 of the cutting blades 21 in the initial cutting blade stages 2 can be compensated by the intermediate cutting depth x2 of the cutting blades 31 in the intermediate cutting blade stages 3.

In general, as illustrated in FIG. 5, when the forming pitch (forming distance between the cutting blade stages 9 in the axial direction L) of the cutting blades 91 in the cutting blade stage 9 is reduced, the cutting depth of the cutting blades 91 decreases, and abrasion thereof can thus be reduced, but a land width w of the cutting blades 91 in the axial direction L decreases, and the lifetime of the cutting blades 91 is thus shortened.

In this regard, in the initial cutting blade stages 2 and the intermediate cutting blade stages 3, occurrence of abrasion of the cutting blades 21 and 31 is reduced as described above, thereby suppressing shortening of lifetime of the cutting blades 21 and 31. In the initial cutting blade stages 2 and the intermediate cutting blade stages 3, the forming pitches of the cutting blades 21 and 31 are reduced, and the cutting depths x1 and x2 of the cutting blades 21 and 31 can thus be reduced.

In addition, the chamfered shape formed at the pair of distal end corners 411 of each of the cutting blades 41 in the final cutting blade stages 4 is larger than the curved shape formed at the pair of distal end corners 211 of each of the cutting blades 21 in the initial cutting blade stages 2. With this configuration, edges of the pair of distal end corners 411 of each of the cutting blades 41 in the final cutting blade stages 4 can be strengthened, thereby suppressing occurrence of abrasion.

As described above, in the broaching cutter 1 according to the present embodiment, the intermediate cutting blade stages 3 having the chamfered shape can reduce the cutting depth formed by the cutting blades 21 in the initial cutting blade stages 2, and occurrence of abrasion thereof can thus be suppressed.

In the example of the broaching cutter 1 according to the present embodiment, the initial cutting blade stages 2, the intermediate cutting blade stages 3, and the final cutting blade stages 4 are continuously formed. Alternatively, in the broaching cutter 1, an additional cutting blade stage having another configuration may be disposed between the initial cutting blade stages 2 and the intermediate cutting blade stages 3 or between the intermediate cutting blade stages 3 and the final cutting blade stages 4. This additional cutting blade stage may have a configuration in which a curved shape or a chamfered shape of a pair of distal end corners of each cutting blade smoothly and continuously changes for each cutting blade stage. The additional cutting blade stage may also have a configuration in which a cutting depth of each of the cutting blades smoothly and continuously changes for each cutting blade stage.

The invention claimed is:

1. A broaching cutter for sequentially cutting a processing hole in a workpiece with a plurality of cutting blade stages provided side by side and for forming a plurality of internal teeth in the processing hole with a plurality of cutting blades arranged side by side in a circumferential direction of each of the cutting blade stages in such a manner that the internal teeth are arranged side by side in the circumferential direction, the broaching cutter comprising:

cutting blade stages configured to cut the processing hole in such a manner that cutting locations of the cutting blades become deeper stepwise in a radial direction of the processing hole in the workpiece, and are also configured to include a plurality of initial cutting blade stages configured with initial cutting blades to cut formation portions to be tooth body portions of the internal teeth, a plurality of intermediate cutting blade stages configured to cut with intermediate cutting blades, the formation portions to be the tooth body portions more deeply than the initial cutting blade stages, and a plurality of final cutting blade stages configured to cut with final cutting blades, formation portions to be clearance portions extending from the tooth body portions toward an outer periphery in the radial direction, the initial cutting blade stages, the intermediate cutting blade stages, and the final cutting blade stages being sequentially arranged side by side such that cutting is performed in an order of the initial cutting blade stages, the intermediate cutting blade stages and the final cutting blade stages, a pair of distal end corners of each of the intermediate cutting blades in the intermediate cutting blade stages and a pair of distal end corners of each of the final cutting blades in the final cutting blade stages each have a curved shape or a chamfered shape larger than a curved shape or a chamfered shape of a pair of distal end corners of each of the initial cutting blades in the initial cutting blade stages, and a structure of the initial cutting blade stages is configured such that a cutting depth is smaller than a cutting depth of the intermediate cutting blade stages and the final cutting blade stages.

2. The broaching cutter according to claim 1, wherein
a guide portion configured to guide a center of the processing hole in the workpiece to a center of the broaching cutter is provided on an upstream side of the initial cutting blade stages in the cutting direction, and
the initial cutting blade stages include a cutting blade stage adjacent to the guide portion.

3. The broaching cutter according to claim 1, wherein
the curved shape or the chamfered shape formed at the pair of distal end corners of each of the intermediate cutting blades in the intermediate cutting blade stages and the curved shape or the chamfered shape formed at the pair of distal end corners of each of the final cutting blades in the final cutting blade stages extend across an overall length of a clearance face in an axial direction of the broaching cutter.

4. The broaching cutter according to claim 2, wherein
the curved shape or the chamfered shape formed at the pair of distal end corners of each of the intermediate cutting blades in the intermediate cutting blade stages and the curved shape or the chamfered shape formed at the pair of distal end corners of each of the final cutting blades in the final cutting blade stages extend across an overall length of a clearance face in an axial direction of the broaching cutter.

5. A broaching cutter for sequentially cutting a processing hole in a workpiece with a plurality of cutting blade stages provided side by side and for forming a plurality of internal teeth in the processing hole with a plurality of cutting blades arranged side by side in a circumferential direction of each of the cutting blade stages in such a manner that the internal teeth are arranged side by side in the circumferential direction, the broaching cutter comprising:

cutting blade stages configured to cut the processing hole in such a manner that cutting locations of the cutting blades become deeper stepwise in a radial direction of the processing hole in the workpiece, and are also configured to include a plurality of first cutting blade stages in which a pair of distal end corners of each of first cutting blades has a curved shape or a chamfered shape and a plurality of second cutting blade stages in which a pair of distal end corners of each of second cutting blades has a curved shape or a chamfered shape larger than the curved shape or the chamfered shape of the first cutting blades in the first cutting blade stages, the first cutting blade stages and the second cutting blade stages being arranged side by side in a cutting direction, and a structure of the first cutting blade stages is configured such that a cutting depth is smaller than a cutting depth of the second cutting blade stages.

6. The broaching cutter according to claim 5, wherein
the first cutting blade stages are disposed on an upstream side of the second cutting blade stages in the cutting direction.

7. The broaching cutter according to claim 6, wherein
a guide portion for guiding a center of the processing hole in the workpiece to a center of the broaching cutter is provided on an upstream side of the first cutting blade stages in the cutting direction, and
the first cutting blade stages include a cutting blade stage adjacent to the guide portion.

* * * * *